Jan. 22, 1957 W. E. DAVIS 2,778,196
AUTOMATIC CONTROL APPARATUS FOR REFRIGERATION SYSTEM
Filed Aug. 18, 1952
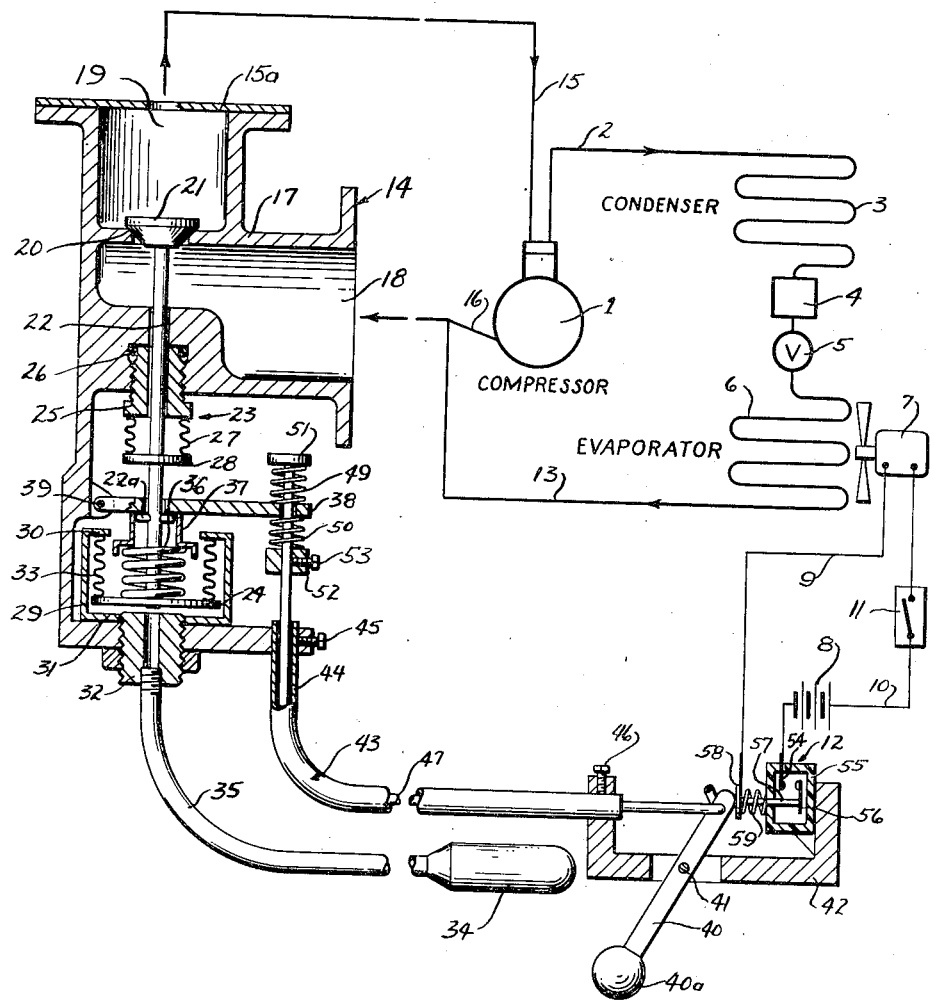
William E. Davis
INVENTOR.
BY Browning & Simms
ATTORNEYS

United States Patent Office 2,778,196
Patented Jan. 22, 1957

2,778,196
AUTOMATIC CONTROL APPARATUS FOR REFRIGERATION SYSTEM

William E. Davis, Houston, Tex.

Application August 18, 1952, Serial No. 304,895

9 Claims. (Cl. 62—3)

This invention relates to an automatic control apparatus for a refrigeration system and particularly for a system employed in air conditioning automobiles or other vehicles.

The air conditioning of automobiles and other vehicles is rapidly growing in popularity. There has been developed a refrigeration system particularly adapted for use in vehicles which is simple to operate, substantially trouble-free, and which permits of easy control. This system is described and claimed in my Patent No. 2,603,-954 granted July 22, 1952, released May 4, 1954, as Reissue No. 23,821, and, as one of its features, employs a valve in the suction to the compressor to control the rate of flow of refrigerant and hence the temperature of the space to be cooled.

It is an object of this invention to provide a control apparatus particularly adapted for use in such a system to automatically control the rate of flow of refrigerant through the compressor and attendant apparatus responsive to the heat load requirement of the space to be cooled.

Another object is to provide such a control apparatus which employs a temperature sensitive means coacting with a refrigerant controlling valve in such a manner that the extent said valve is opened is automatically regulated responsive to temperature variations in a space to be cooled.

Another object is to provide in an air refrigerating and conditioning system, of the type in which the refrigerant circuit is arranged so that the lowered pressure produced by a flow controlling device in the suction to the compressor is isolated from the oil sump or crank case of the compressor, an improved flow controlling device comprising a valve wherein a valve member is automatically moved toward and from seated position by a thermally expansible fluid contained in a closed chamber so that a predetermined temperature can be maintained in said vehicle and wherein there is further provided a manual control adapted to vary the force required to open and close said valve whereby said predetermined temperature can be changed.

Another object is to provide a control apparatus for such a refrigerating system employed to cool a space wherein a valve controlling the rate of flow of refrigerant through said system is urged toward open position by a thermally expansible fluid whose pressure varies responsive to the temperature of said space, the valve also being urged toward closed position by a resilient means which is adjustable to vary its urging force thereby permitting changing the temperature at which said space is to be automatically maintained by the action of said fluid.

Another object of this invention is to provide an orifice for limiting the maximum rate of flow of refrigerant to a compressor in a refrigeration system having a refrigerant controlling valve in the suction to the compressor, the crank case of the latter being isolated from the pressure between the valve and compressor.

Another object is to provide a control apparatus including a valve for controlling the rate of flow of refrigerant through a system wherein the control points can be located remotely from the valve or compressor.

Another object is to provide a means for shutting off flow of refrigerant through an evaporator and at the same time selectively permitting a blower moving air across the evaporator to continue operation for ventilating purposes or shutting off the blower when ventilation is not desired.

Another object is to provide a control apparatus including a valve for controlling the rate of flow of refrigerant through a refrigerating system wherein there is additionally provided a thermally expansible fluid urging the valve toward open position responsive to an increase in temperature in the space to be cooled, a resilient means urging the valve toward closed position, a manual control for varying the force exerted by said resilient means and a means for adjusting the manual control by changing the force exerted by said resilient means whereby the difference between the high and low temperature positions of the manual control can be adjusted to correspond to the temperatures desired or, when the manual control is to be provided with a temperature scale for easy setting of the control to a desired temperature, then to permit easy and rapid calibration of the manual control to the temperature scale.

Other objects, advantages and features of this invention will be apparent to one skilled in the art upon a consideration of the written specification, the appended claims and the drawing wherein there is shown schematically a refrigeration system having incorporated therein the control apparatus of this invention, the latter being shown partially in cross-section.

The refrigeration system illustrated in the drawing is of the type disclosed and claimed in my patent No. 2,603,954 granted July 22, 1952, reissued May 4, 1954, as Reissue No. 23,821. In the system illustrated, compressor 1 is of the type which has a suction and discharge situated on the same end of the cylinder so that only one face of the piston is exposed to the refrigerant coming in from the suction and going out through the discharge. The other end of the piston is exposed to the crank case. This compressor, when the installation is to be on automobiles, or other vehicles, can be powered by connection with the vehicle engine or, if desired, can be connected to any other rotating part of the vehicle such as the wheels, etc. In such an arrangement, it will be apparent that compressor 1 is not a constant speed compressor but its speed will vary with that of the vehicle. Since the heat load to be removed from the vehicle by the refrigeration system does not necessarily vary directly with the speed of the vehicle, it is the purpose of this invention to provide a control means for controlling the rate of refrigerant flow to compressor 1 in accordance with the heat load which must be borne to keep a space at a predetermined temperature and irrespective of the speed of the compressor.

The compressor discharge conduit 2 leads to a condenser 3 where the compressed refrigerant is condensed to a liquid. The condenser may be situated in a current of air passing through or around a vehicle. A liquid receiver 4 is provided from which the liquid refrigerant passes through an expansion valve 5 where it is expanded in the conventional manner to provide a low temperature fluid for evaporator 6. A blower 7 can be provided to move air across the evaporator to cool the air and then to cause it to flow into the space to be cooled, such as the interior of a vehicle or, when cooling is not required, to ventilate such space. A circuit, which can include a battery 8 and leads 9 and 10, is provided to power the blower. A time delay switch 11 can be inserted in the circuit, if desired, to delay starting of the blower 7 for a predetermined time interval after switch 12 has been closed to prevent hot air from being blown into the vehicle before the evaporator becomes cooled. Switch 12 and its function in the control system will be described in detail below. The warmed refrigerant leaves the evaporator through conduit 13 and passes through a control valve, designated generally by the numeral 14, into suction line 15 and thence back to the compressor. As described in the aforesaid patent, a conduit 16 is provided to place the crankcase of compressor 1 under an atmosphere of refrigerant at substantially the same pressure at that of the evaporator and hence the lowered pressure produced by valve 14 at the downstream side thereof is isolated from the crankcase.

Referring now to the control valve and its appurtenant automatic and manual controls, there is provided a casing 17 having an inlet port 18 and an outlet port 19 so as to provide a flow passage through the valve. Disposed within this flow passage is a valve seat 20 adapted to have a valve member 21 cooperate therewith to control the rate of flow of refrigerant through the valve. An interchangeable orifice plate 15a is provided to limit the maximum flow of refrigerant through the valve irrespective of how far valve member 21 may move away from its seat.

A flow limiting device, such as orifice plate 15a, is quite important to prevent overloading the compressor at high speeds. The compressor is desirably sized to handle full cooling load at relatively low speeds so that the vehicle can be cooled at low as well as high speeds. Thus, the compressor may, for example, be sized to handle a load of two tons of refrigeration at a vehicle speed of 20 miles per hour. If the speed of the vehicle is tripled to 60 miles per hour, the compressor speed is likewise tripled so that it will endeavor, if refrigerant flow is not restricted, to handle a refrigerant load of about six tons. It would thus be seriously overloaded. To prevent this, orifice plate 15a is chosen to have an opening of such size as to limit flow of refrigerant therethrough to the compressor capacity even though valve 14 be fully opened. Then the compressor need be large enough to handle the required refrigerant load at low vehicle speeds and, as the speed of the vehicle increases to be in excess of such low speeds, the mass rate of flow of refrigerant to the compressor does not increase beyond that which the compressor can handle. While the pressure between the orifice and compressor may decrease with increased compressor speed, the mass of refrigerant flowing does not so increase once the critical rate of flow through the orifice is reached. An orifice plate 15a is preferred only because it can be easily sized, is cheap to manufacture and is not susceptible to adjustment by unskilled persons; however, a stop can be provided for valve member 21 to limit its maximum opening and thereby limit the rate of flow refrigerant.

As a part of valve member 21, there is provided a valve stem 22 which extends through a seal, designated generically by the numeral 23, in the valve casing to provide a connection between the valve member and part 24. The valve stem seal 23 comprises a nut or bushing 25 which can be threaded into the valve casing and sealed against fluid flow past the threads by a suitable seal, such as O-ring 26. Valve stem 22 has a rather loose fit with the bushing but is sealed against refrigerant flow by means of a bellows 27 connected at one of its ends to bushing 25 and at its other end to a disc 28, the latter having a sealed connection with and carried by valve stem 22. In this manner, the valve stem is free to move longitudinally and yet refrigerant is prevented from flowing between it and the valve casing.

From the description thus far given, it will be apparent that valve member 21 is movable toward and from seat 20 so as to vary the opening therebetween and in this manner control the rate of flow of refrigerant through the valve and, when seated, to cause such flow to cease.

An automatic control is provided to move the valve member toward and from its seat in response to the temperature of the space to be cooled so that the flow of refrigerant through the valve will be increased with an increase in the space temperature and will be decreased with a decrease in the space temperature. Such an automatic control preferably includes a thermally expansible fluid contained in a closed chamber which includes movable part 24 as a portion thereof to thereby provide a variable volume chamber. The chamber can comprise a housing 29 which is illustrated as a cup having an annular inturned flange 30 and a bottom 31 screwed to a bushing 32. To form a fluid tight seal at the connection between the cup and bushing 32, it is preferred that a welded or soldered connection be made at this point. Disposed within the cup is a bellows 33 having one of its ends sealingly joined to flange 30 and the other end sealingly joined to movable part 24. A control bulb 34 is provided so as to be disposable in the space to be cooled and remote from the control valve, the latter being mounted adjacent the compressor if desired. Control bulb 34 is placed in communication with the interior of cup 29 by a conduit, preferably a capillary tube 35, and in this sense the bulb is an extension of the chamber, such extension being placeable in heat exhange contact with the air in the space to be cooled. Bulb 34, tube 35 and the space between cup 29, bellows 33 and movable part 24, all of which constitute a closed chamber are filled with a thermally expansible fluid. With this arrangement, a change in temperature of the fluid will cause it to tend to expand with the result that an increased force is applied against movable part 24 to move valve member 21 away from its seat. On the other hand, upon a decrease in temperature of the fluid, the force applied against movable part 24 will be decreased so that the valve member is permitted to move toward its seat.

In accordance with one important feature of this invention, a manual control is provided which is capable not only of positively closing the valve, but also of changing the set-point or temperature at which the thermally expansible fluid will normally maintain the space to be cooled. Such a manual control includes a resilient means, illustrated in the form of spring 36, which acts to urge the valve member toward seated position and hence in opposition to the urging force of the thermally expansible fluid. One end of spring 36 bears against movable part 24 and the other end bears against a spring retainer cup 37 which in turn bears against a movable element illustrated as a lever 38. Lever 38 is pivoted as at 39 to an extension of the valve casing or other suitable point having a fixed position relative to valve member 21 and seat 20. In this manner there is provided an element movable to adjust the urging force of the resilient means 36 by varying the spacing between the ends of spring 36.

The lever has its free end joined to a connection with a manually positionable element. The latter element can comprise a control handle 40 pivoted at 41 to a support member 42. The support member can be attachable to the dashboard of an automobile or other convenient place for manipulation by an operator. A push-pull cable 43 is employed to provide a connection between control handle 40 and lever 38. In connecting the push-pull cable, its housing 44 can be adjustably connected at each of its ends, as by set screws 45 and 46, to the extension of the valve casing and to the member 42, respectively. The interior cable 47 has one of its ends connected to control handle 40, preferably in an adjustable manner, and the other end extends from the end of housing 44 to act as a rod which passes through an opening in lever 38. A pair of opposing springs 49 and 50 have their adjacent ends abutting lever 38 and their other ends abutting stops 51 and 52. Stop 52 is positionable along the rod-like end of cable 47 and is fixedly connected thereto by set screw 53. In this manner, it is possible to increase or decrease the distance lever 38 is moved by a given movement of handle 40. Thus, by moving stop 52 downward as the apparatus is illustrated in the drawing, it will be possible to decrease the movement of lever 38 by the control handle 40 when the latter is moved throughout its range of movement. By moving stop 52 upwardly as shown in the drawing, the movement of lever 38 is increased for the same degree of movement of handle 40. In this manner, it is possible to adjust the spread of temperatures between the extremities of the permissible movement of control handle 40. After adjusting the spread of temperatures in this manner, the handle 40 can be repositioned by loosening either of screws 45 or 46 and moving the handle to the desired position. Thus, for example, if it is desired that control handle 40 be movable throughout a range of 60 to 90° F., stop 52 is moved to give the 30° spread for the permissible movement of handle 40 and then the handle positioned so that its ends positions correspond to 60° and 90° by loosening screw 45 and moving the handle.

Control handle 40 is at "off" position when the ball end is moved to its leftmost position as shown in the drawings. To positively close valve member 21, a stop part is carried thereby which is engageable with lever 38 upon movement of handle 40 to "off" position. Such stop can comprise a pin 22a on valve stem 22 and situated to be engageable by lever 38 after the latter has moved a predetermined distance to increase the urging force of spring 36.

It will also be noted that switch 12 comprises a fixed contact 54 mounted in insulated box 55 and a movable contact 56 carried on a pin 57. Pin 57 has a head 58 to which lead 9 is connected. A spring 59 can be provided between head 58 and box 55 to bias the movable contact towards the fixed contact. The movable contact is so spaced with respect to handle 40 that after the latter has moved to close the valve, switch 12 is not opened so that the blower can continue to operate and ventilate the vehicle. However, a slight additional movement of handle 40 toward "off" position will cause switch 12 to open thereby stopping the blower. Upon movement of handle 40 to open the valve, switch 12 will be closed thereby permitting starting of the blower. In this manner, there is provided a manual control for closing the valve independently of the temperature sensitive control and a switch in a circuit to the blower, the switch being opened by the manual control when the latter is moved to its "off" position.

In describing the operation of this apparatus, let it be assumed that handle end 40a is moved to the right so that switch 12 closes and blower 7 starts. Upon such movement, lever 38 will pivot to disengage stop 22a and to reduce the force exerted by spring 36 on part 24. Valve member 21 then can move away from its seat under the urging of the thermally expansible fluid to permit refrigerant to pass into the compressor and thence through the refrigeration system. Handle 40 will be moved, of course, to a predetermined position which position corresponds to the desired temperature to which the space is to be cooled. It will be noted that even though the fluid moves valve member 21 off its seat to full open position, the mass rate of flow of refrigerant to the compressor cannot exceed that for which orifice plate 15a was chosen to pass even though the compressor is operating at a very high speed so that the suction pressure is very low relative to the evaporator pressure. As the temperature in the space to be cooled decreases, the temperature of the fluid in bulb 34 is lowered and its pressure accordingly decreases. The resultant decrease in force against movable part 24 permits the opposing force of spring 36 to move the valve member toward closed position. At some point when the rate of flow of refrigerant through valve 14 is just sufficient to maintain the space to be cooled at the temperature at which handle 40 has been set, the opposing forces of spring 36 and of the fluid will be balanced so that valve member 21 will remain partially opened to permit such rate of flow of refrigerant to continue. However, should the temperature of the space to be cooled increase for any reason, the force exerted by the thermal fluid will likewise increase thereby tending to open the valve. It will remain in such increased open position until the temperature of the space to be cooled again decreases after which the valve member will be moved toward closed position due to the decrease in force of the thermal fluid acting on movable part 24. If it is desired to change the temperature at which the space to be cooled is maintained, handle end 40a can be shifted accordingly. Assuming that it is shifted to the right, lever 38 will move upwardly thereby decreasing the force of spring 36 exerted on member 24. The resultant unbalance of force between the fluid and the spring will permit the valve member to be opened to a greater extent before the fluid and spring force again are balanced thereby permitting more refrigerant to flow to the compressor. As a result, the temperature of the space to be cooled will be lowered.

When it is desired to shut off the flow of refrigerant, handle end 40a is moved to the left which causes lever 38 to move downwardly into contact with pin 22a. This moves the valve member positively onto its seat thereby shutting off flow of refrigerant. This shut-off is made irrespective of the pressure of the thermally expansible fluid in the closed chamber inasmuch as there is a positive engagement between the lever 38 and the valve member. With handle 40 in this position, switch 12 is still closed so that the blower continues to operate. However, slight additional movement of the handle stops the blower by opening switch 12.

It will be thus seen that the automatic control which embodies the thermally expansible fluid acts to maintain the temperature of a space to be cooled at any given predetermined temperature at which the apparatus has been set by movement of handle 40.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention wtihout departing from the scope thereof, it is to be understood that all matter herein set forth or shown in the accompanying drawings is to be interpreted as illustrative and not in a limiting sense.

The invention having been described, what is claimed is:

1. An apparatus for controlling the rate of flow of a refrigerant employed to cool a space which comprises, in combination, a valve including a seat and a valve member as a part thereof, a housing including a bellows as a part thereof to provide a variable volume chamber, a connection between said bellows and said valve member to move the latter from said seat upon an increase in volume of said chamber, a control bulb, a conduit connecting said bulb with said chamber, a fluid filling said chamber, conduit and bulb and acting against said bellows to urge said valve member from said seat responsive to increase in temperature of said fluid, a resilient means means comprising a spring with one end having a force transmitting connection with said valve member and the other having an element movable to adjust the force exerted by said resilient means and having a force transmitting connection with the other end of said spring, said movable element being positionable to vary the spacing between the ends of said spring, and a stop part carried by said valve member and engageable with said movable element, said stop part being situated to so engage said movable element after the latter has moved a predetermined distance to increase the urging force of said spring.

2. The apparatus of claim 1 in combination with an orifice plate in series with said valve.

3. An apparatus for controlling the rate of flow of a refrigerant employed to cool a space which comprises, in combination, a valve including a seat and a valve member movable to and from said seat, a housing including a bellows as a part thereof to provide a variable volume chamber, a connection between said bellows and said valve member to move the latter from said seat upon an increase in volume of said chamber, a control bulb, a conduit connecting said bulb with said chamber, a fluid filling said chamber, conduit and bulb and acting against said bellows to urge said valve member from said seat responsive to an increase in temperature of said fluid, a resilient means urging said valve member toward seated position, an element movable to adjust the force exerted by said resilient means, a manually positionable element, and a connection between said positionable element and said movable element comprising a rod, opposing springs having their adjacent ends abutting said movable element and their other ends abutting stops on said rod, the rod being longitudinally movable by said positionable element.

4. The apparatus of claim 3 wherein at least one of said stops is adjustable to vary the spacing between said other ends of said springs.

5. In a refrigeration apparatus employing a compressor and a refrigerant circuit containing a flow controlling device, such circuit being arranged so that the lowered pressure produced by said device at the down-stream side thereof is isolated from the crank case of said compressor, said circuit including an evaporator and a blower for moving air to be cooled across said evaporator, the improved flow controlling device in combination therewith which comprises a valve including a seat and a valve member movable to and from said seat, a housing including a bellows as a part thereof to provide a variable volume chamber, a connection between said bellows and said valve member to move the latter from said seat upon an increase in volume of said chamber, a control bulb, a conduit connecting said bulb with said chamber, a fluid filling said chamber, conduit and bulb and acting against said bellows to urge said valve member from said seat responsive to an increase in temperature of said fluid, a resilient means urging said valve member toward seated position, an element movable to adjust the force exerted by said resilient means on said valve member, a manual control connected to said movable element and adapted to move the latter to seat said valve member, a switch in a circuit to said blower, said switch being opened by movement of said manual control to closed-valve position.

6. In a refrigeration system including a compressor, a condenser, an evaporator, a blower for moving air across said evaporator into a space to be cooled and a refrigerant circuit arranged so that the lowered pressure downstream of a flow controlling device in said circuit is isolated from the crank case of said compressor, the improved flow controlling device comprising a valve controlling flow of refrigerant to said compressor, a temperature sensitive control connected to said valve to open and close the same upon an increase or decrease of temperature in the space to be cooled, a manual control for closing said valve independently of said temperature sensitive control, and a switch in a circuit to said blower, said switch being opened by said manual control when the latter is moved to closed-valve position.

7. A refrigeration system comprising a compressor having a compression chamber in combination with a prime mover having duties requiring variable speeds of operation independent of the amount of refrigeration required, said compressor being connected to said prime mover to be driven thereby at speeds dependent on the speed of said prime mover, a condenser, evaporator, and expansion restricting means, means for connecting said units in series to form a closed refrigerating system, and a restricting means having an opening with a throat of such maximum size as to limit, regardless of the speed of operation of the compressor, the maximum flow of gas through the compressor to a predetermined maximum mass within the capacity of the compressor to handle and located in the low pressure side of the system upstream from the compression chamber of the compressor.

8. A refrigeration system comprising a compressor having a compression chamber and an oil retaining space in combination with a prime mover having duties requiring variable speeds of operation independent of the amount of refrigeration required, said compressor being connected to said prime mover to be driven thereby at speeds dependent on the speed of said prime mover, a condenser, an evaporator, and expansion restricting means, means for connecting said units in series to form a closed refrigerating system, a restricting means having an opening with a throat of such maximum size as to limit, regardless of the speed of operation of the compressor, the maximum flow of gas through the compressor to a predetermined maximum mass within the capacity of the compressor to handle and located in the low pressure side of the system upstream from the compression chamber of the compressor, said oil retaining space being isolated from that portion of the system between said last mentioned restricting means and the compression chamber, and means providing communication between said oil retaining space and a normally gas-filled portion of the system.

9. A refrigeration system comprising in combination with a prime mover having required speeds of operation independent of the amount of refrigeration required, a compressor connected to said prime mover to be driven thereby at speeds dependent on the speed of said prime mover and having an inlet, a discharge, and an oil retaining space, a condenser having its inlet connected to the discharge from said compressor, means connected to the outlet of said condenser providing a restricted passage from the condenser, and an evaporator connected to the outlet from said passage, a return line from the evaporator to the compressor inlet, a control valve means interposed in said return line to provide a control pressure space between said control valve and the compressor inlet isolated pneumatically and hydrostatically from the oil retaining space so that the control pressure is not communicated directly to the oil retaining space, said oil retaining space being in communication with a gas-filled portion of the system downstream from the compressor discharge and upstream from the control valve whereby a pressure other than the control pressure is exerted on the oil retaining space and any oil which may leak into the system will be restored to the oil retaining space, and means for setting a maximum on the mass of gas passing through said valve means and additional means for varying the opening of said control valve means independently of the evaporator pressure to vary the mass of gas below said maximum.

References Cited in the file of this patent

UNITED STATES PATENTS

| | | |
|---|---|---|
| 1,238,051 | Peterson | Aug. 21, 1917 |
| 1,436,815 | Marshall | Nov. 28, 1922 |
| 1,768,602 | Hull | July 1, 1930 |
| 1,780,442 | Schmieding | Nov. 4, 1930 |
| 2,048,025 | Philipp | July 21, 1936 |
| 2,155,516 | Tull | Apr. 25, 1939 |
| 2,178,807 | Ploeger | Nov. 7, 1939 |
| 2,224,377 | Clark | Dec. 10, 1940 |
| 2,301,656 | Hirche | Nov. 10, 1942 |
| 2,321,819 | Johnson | June 15, 1943 |
| 2,338,362 | Smith | Jan. 4, 1944 |
| 2,418,853 | Shoemaker | Apr. 15, 1947 |
| 2,547,070 | Aughey | Apr. 3, 1951 |
| 2,581,956 | Jones | Jan. 8, 1952 |
| 2,603,954 | Davis | July 22, 1952 |